United States Patent [19]

Heitmann

[11] Patent Number: 4,526,199

[45] Date of Patent: Jul. 2, 1985

[54] VALVE FOR THROTTLING FLUID

[75] Inventor: Arnold M. Heitmann, Swampscott, Mass.

[73] Assignee: Northern Research & Engineering Corp., Woburn, Mass.

[21] Appl. No.: 551,409

[22] Filed: Nov. 14, 1983

[51] Int. Cl.³ .......................... F16K 11/07; F16K 3/26
[52] U.S. Cl. ................................ 137/625.31; 251/232; 415/148
[58] Field of Search .................... 137/625.31; 415/148; 431/188; 251/232

[56] References Cited

U.S. PATENT DOCUMENTS

| 3,127,909 | 4/1964 | Alamprese | 137/625.31 |
| 3,392,909 | 7/1968 | Turner | 415/148 X |
| 4,049,021 | 9/1977 | Fromm et al. | 137/625.31 |

FOREIGN PATENT DOCUMENTS

| 323422 | 7/1920 | Fed. Rep. of Germany | 137/625.31 |

Primary Examiner—Arnold Rosenthal
Attorney, Agent, or Firm—B. J. Murphy

[57] ABSTRACT

The valve, according to the illustrated embodiment, comprises an annular chamber formed of concentric inner and outer walls, the outer wall having, in the periphery thereof, a multiplicity of equally spaced apart rectangular slots. An annulus, having a corresponding multiplicity of slots, is rotatably journalled, concentrically, on the outer periphery of the outer wall in order that, upon rotation thereof, relative to the annular chamber, the slots in the wall, and those in the annulus, come into or out of registry. A crank mechanism is coupled between the annulus, and the structure defining the annular chamber, to selectively rotate the annulus through a limited arc to bring the slots into and out of such registry. The valve is used to throttle the velocity of compressed gas product conducted thereto by a gas compressor, and to subdivide compressed gas issuing therefrom into a multiplicity of fine jets.

14 Claims, 5 Drawing Figures

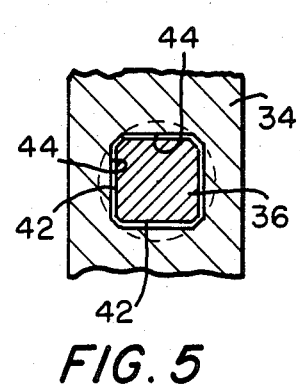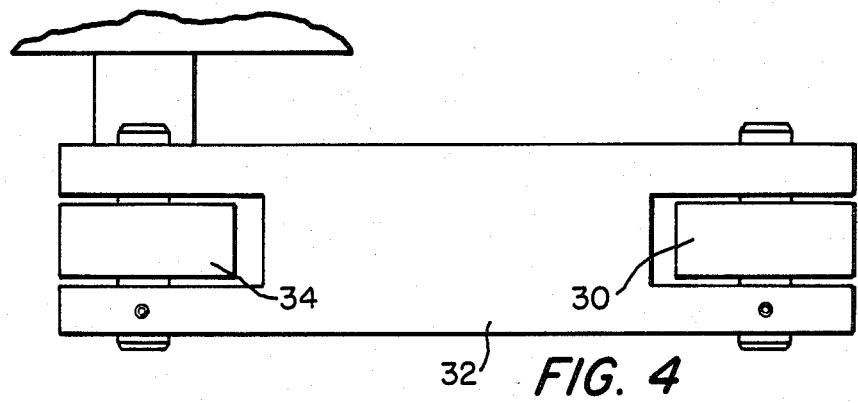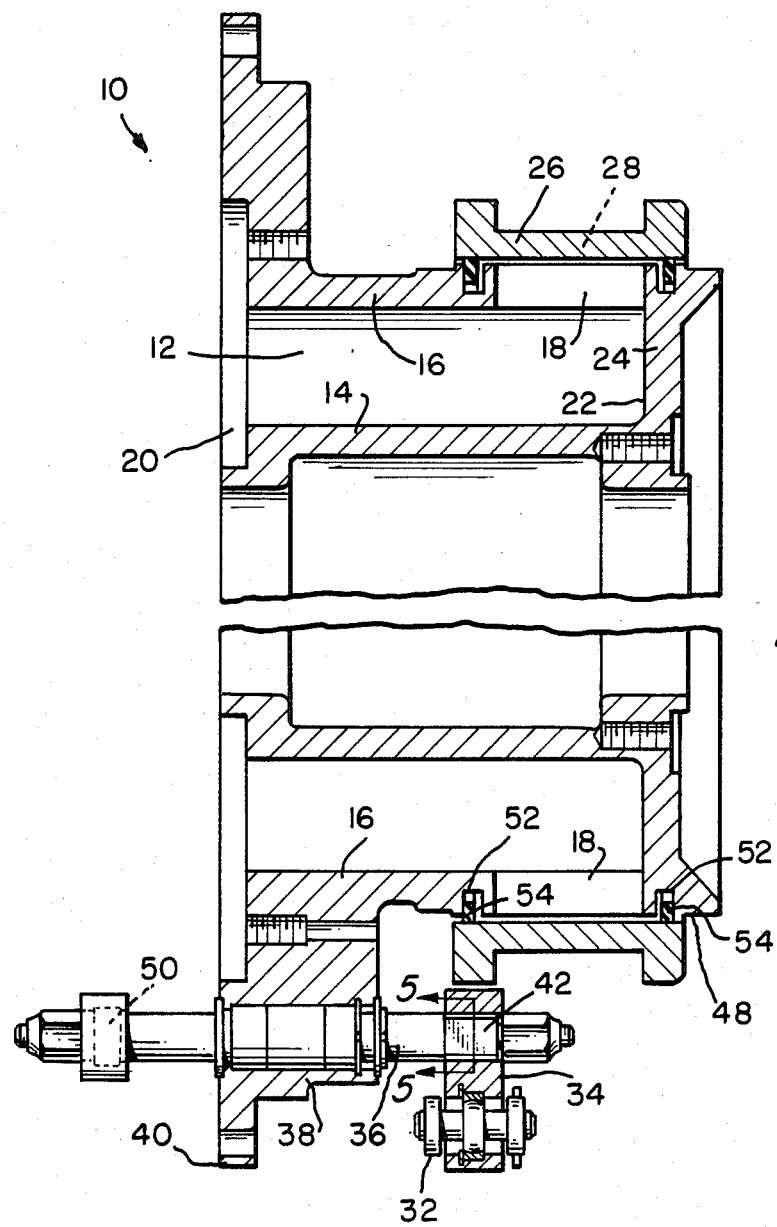

VALVE FOR THROTTLING FLUID

This invention pertains to throttle valves, and in particular to a throttle valve having a special utility in connection with gas compressors in which the compressed gas produced is discharged from such compressors in an annular configuration. Throttling valves of the aforesaid type known in the prior art are unfavorable in performance in that, commonly, they cause the compressed gas product throttled thereby to exhibit a damaging turbulence. It is an object of this invention to set forth a valve for throttling fluid which separates the flow of the discharging compressed gas product into a multiplicity of discharging jets and, as a consequence thereof, localized turbulence and mixing rapidly attenuates the discharging jet velocities.

It is particularly an object of this invention to disclose a valve for throttling fluid, comprising first means defining an annular chamber; said chamber having means for admitting fluid thereinto; said chamber also having means for discharging fluid therefrom; and second means, coupled to said first means, for throttling fluid discharged from said chamber; wherein at least one of said first and second means is selectively movable relative to the other thereof; said discharging means and said second means each have apertures which, responsive to movement of said one means relative to said other thereof, come into and remove from a common, aligned registry; and said apertures comprise means subdividing fluid, discharged from said chamber, into a plurality of fluid jets.

Further objects of this invention, as well as the novel features thereof, will become more apparent by reference to the following description taken in conjunction with the accompanying figures; in which:

FIG. 2 is a cross-sectional view taken along section 2—2 of FIG. 1;

FIGS. 2 and 3, however, show the rotatable annulus slightly rotated from the FIG. 1 positioning thereof;

FIG. 4 is a view taken along 4—4 of FIG. 1; and

FIG. 5 is a cross-sectional view taken along section 5—5 of FIG. 2.

Figure 1:
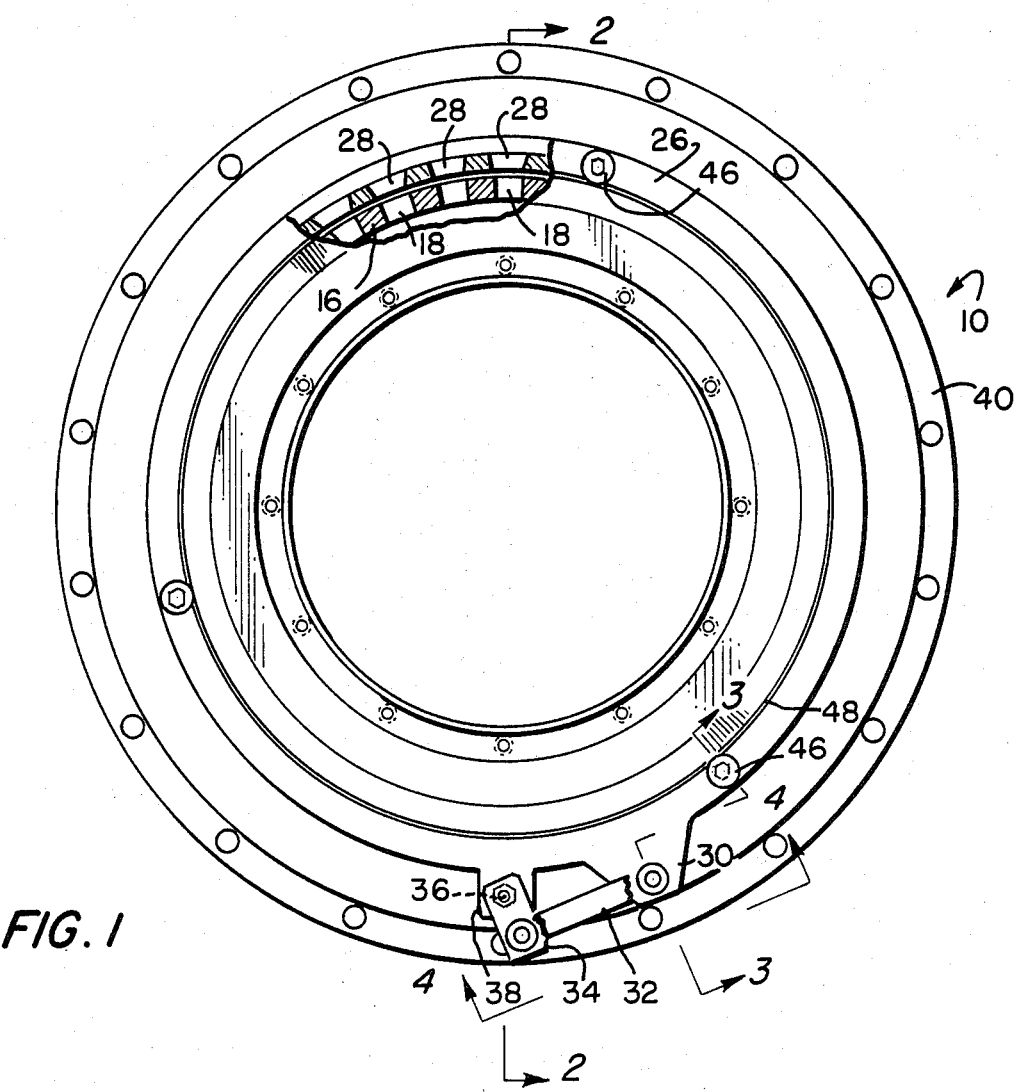
FIG. 1 is an elevational view of the valve, according to an embodiment thereof, taken from the right-hand side of FIG. 2.
Figure 3:
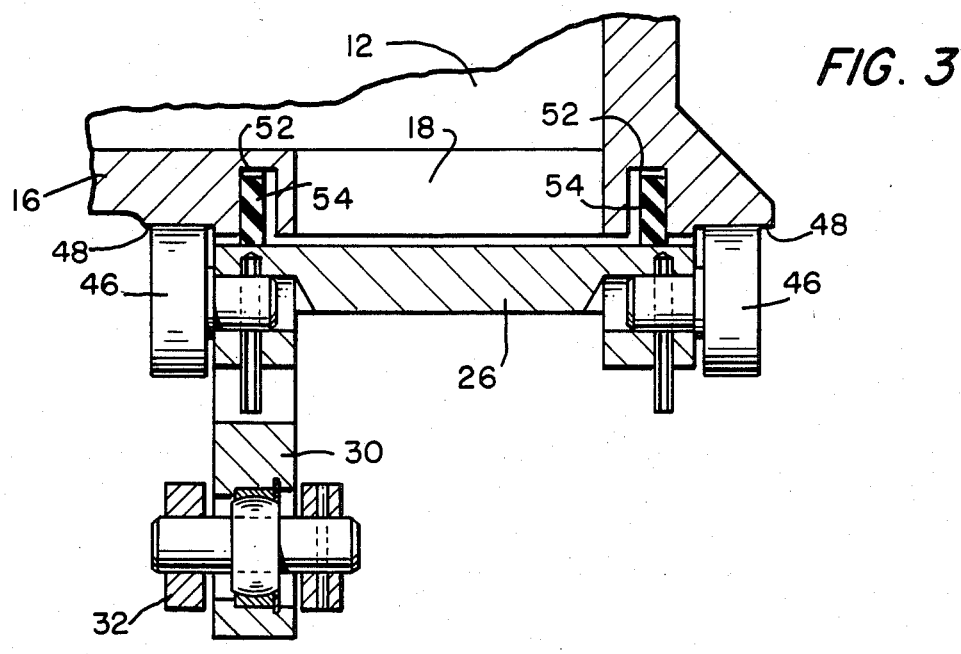
FIG. 3 is a cross-sectional view taken along section 3—3 of FIG. 1.

As shown in the figures, the novel throttling valve 10 comprises an annular chamber 12 formed of concentric inner and outer walls, 14 and 16, respectively. The outer wall 16, along a limited axial length thereof, has a multiplicity of equally spaced-apart, rectangular slots 18 formed therein. The slots 18 are of such number, and sum such an area, that they subsist in approximately half the periphery of the outer wall 16, throughout the aforesaid limited axial length thereof. The chamber 12 has an open, annular end 20 for admitting compressed gas thereinto. The valve 10 is especially useful with gas compressors having annular discharges, such as the Centac ® compressor manufactured and marketed by Ingersoll-Rand Company, and disclosed in U.S. Pat. No. 4,010,016 issued Mar. 1, 1977 for "A Gas Compressor" and U.S. Pat. No. 4,087,197 issued May 2, 1978 for "A Gas Compressor, and for use with a Gas Compressor, a Gear Housing and Gas Handling Assembly, and Heat Exchanging Assembly", both patents issued to Ronald L. Haugen.

The annular chamber 12 is closed at the axial end 22, opposite end 20, by a wall 24, and an annulus 26 is rotatably journalled about the outer periphery thereof. The annulus 26 has a same multiplicity of slots 28 formed therein, as are formed in wall 16, and along a corresponding axial length of the annulus 26. Too, slots 28 also occupy approximately half the periphery of the annulus, along the latter axial length thereof. Therefore, with rotation of the annulus 26, relative to the outer wall 16 of the chamber 12, the slots 18 and 28 either come into registry, or the annulus 26 throttles or closes off the slots 18 in the outer wall 16. By relative, selective positioning of the annulus 26, discharge of compressed gas product through the annular chamber 12 can be selectively throttled. Additionally, the discharged compressed gas is subdivided into a multiplicity of fine jets in which the velocity thereof is quickly attenuated due to the aforesaid local turbulence and mixing.

The annulus 26 has a lug 30 extending radially therefrom which pivotably mounts a tie rod 32 via one end of the latter. The tie rod 32, at the opposite end thereof, receives an arm 34. The tie rod 32, at the aforesaid opposite ends, defines bifurcations. The lug 30 is pivotally received in one of these, and the arm 34, at one end thereof, is pivotally received in the other bifurcation. The opposite end of the arm 34 is connected to a shaft 36 which is journalled in a boss 38 formed on an outer mounting flange 40 which circumscribes the chamber 12. Intermediate the length of the shaft 36 are formed flat sides 42. The arm 34 has an aperture formed therein with corresponding flat sides 44. Hence, the arm 34 is keyed to the shaft 36 in order that, when the shaft 36 is rotated, the arm 34 will be caused to slue through an angle. The aforesaid defines a crank mechanism so that, upon rotation of the shaft 36, the arm 34 causes the tie rod 32 to translate. The latter, in turn, moves the lug 30, and the annulus 26 from which it projects, through a small angle. It is in this manner that the slots 28 in the annulus 26 and in the outer wall 16, are brought into and out of registry.

Astride the periphery of the chamber 12, and mounted to the annulus 26, are a plurality of rollers 46. The periphery of the outer wall 16 defines recessed tracks 48 with which the rollers 46 are engaged. The track-engaged rollers 46 support the annulus 26 radially, and in a slightly spaced-apart juxtapositioning or proximity to the outer wall 16. Further, the rollers 46 also constrain the annulus 26 against axial displacement relative to the outer wall 16.

The shaft 36 of the crank mechanism reaches outwardly from valve 10 proper, and further has a second flatted portion 50. Such is engageable by some ancillary, operating means (not shown) for rotating the shaft 36 to cause the angular displacement of the annulus 26, and consequently the controlled throttling of fluid discharged through the valve 10. In the periphery of the outer wall 16, astride the slots 18, are channels 52. The latter receive seals 54 therein for sealing engagement with the underside of annulus 26.

While I have described my invention in connection with a specific embodiment thereof, it is to be clearly understood that this is done only by way of example and not as limitation to the scope of my invention as set forth in the objects thereof and in the appended claims.

I claim:

1. A valve for throttling fluid, comprising:
   first means defining an annular chamber;

said chamber having means for admitting fluid thereinto;

said chamber also having means for discharging fluid therefrom; and second means, coupled to said first means, for throttling fluid discharge from said chamber; wherein at least one of said first and second means is selectively movable relative to the other thereof;

said discharging means and said second means each have apertures which, responsive to movement of said one means relative to said other thereof, come into and out of a common, aligned registry;

said apertures comprise means for subdividing fluid, discharged from said chamber, into a plurality of fluid jets;

said chamber comprises a pair of substantially concentric walls; and one of said walls has given ones of said apertures, of said discharging means, formed therein.

2. A valve, according to claim 1, wherein:

said chamber has a center axis; and said discharging means comprises means for discharging fluid from said chamber in planes transverse to said axis.

3. A valve, according to claim 2, wherein:

said discharging means further comprises means for discharging fluid from said chamber radially of said axis.

4. A valve, according to claim 2, wherein:

said discharging means further comprises means for discharging fluid from said chamber normal to, and outwardly relative to, said axis.

5. A valve, according to claim 1, wherein:

said apertures are substantially uniformly spaced about the periphery of said one wall, within a given, axial length of said one wall; and said apertures occupy substantially half the periphery of said given, axial length of said one wall.

6. A valve, according to claim 1, wherein:

said walls comprise inner and outer walls of said chamber; and said outer wall and said one wall are the same.

7. A valve, according to claim 1, wherein:

said second means comprises an annulus;

said annulus has the other of said apertures formed therein;

said latter, other apertures are substantially uniformly spaced about the periphery of said annulus, within a given axial length thereof;

said latter, other apertures occupy substantially half the periphery of said given length of said annulus; and further including means supporting said one wall and said annulus in concentric, spaced-apart adjacency.

8. A valve, according to claim 7, wherein:

said supporting means comprises bearing means fastened to one of said first and second means and in contacting engagement with the other of said first and second means.

9. A valve, according to claim 8, wherein:

said bearing means comprises means for (a) supporting said other means, of said first and second means, radially relative to said one means thereof, and (b) constraining said other means against axial movement relative to said one means.

10. A valve, according to claim 9, wherein:

said bearing means comprises a plurality of rollers, fastened to said annulus, rotatable on axes;

said chamber has a center axis; and said axes are parallel with said axis.

11. A valve, according to claim 7, further including:

actuator means, coupled to both said first and second means, operative for causing relative movement between said one wall and said annulus.

12. A valve, according to claim 11, wherein:

said actuator means comprises a crank;

said crank having (a) a shaft journalled in said first means, (b) a tie rod pivotably coupled at one end thereof to said annulus, and (c) an arm secured to said shaft at one end thereof, and pivotably coupled, at the other end thereof to said tie rod, at the other end of said tie rod.

13. A valve, according to claim 12, wherein:

said shaft and said arm have mutually engaged keying means for causing a sluing movement of said arm in response to a rotation of said shaft.

14. A valve, according to claim 13, wherein:

said shaft has a shank portion, projecting from said first means, disposed for engagement thereof by ancillary means for causing rotation of said shaft.

* * * * *